(12) United States Patent
Novak et al.

(10) Patent No.: US 10,423,406 B2
(45) Date of Patent: Sep. 24, 2019

(54) SOFTWARE FEATURE COMPILATION WITH RUNTIME CONFIGURATION

(71) Applicant: Microsoft Technology Licensing, LLC, Redmond, WA (US)

(72) Inventors: Michael J. Novak, Redmond, WA (US); Sivaramakrishna Mopati, Issaquah, WA (US); Gerald Haslhofer, Bellevue, WA (US); Marc Wautier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 15/691,556

(22) Filed: Aug. 30, 2017

(65) Prior Publication Data

US 2019/0065179 A1    Feb. 28, 2019

(51) Int. Cl.
*G06F 9/44* (2018.01)
*G06F 8/71* (2018.01)
*G06F 8/41* (2018.01)

(52) U.S. Cl.
CPC ............. *G06F 8/71* (2013.01); *G06F 8/447* (2013.01)

(58) Field of Classification Search
CPC .......... G06F 8/71; G06F 9/44505; G06F 8/20; G06F 8/61; G06F 8/36
USPC ................................................... 717/121
See application file for complete search history.

(56) References Cited

U.S. PATENT DOCUMENTS

2008/0120129 A1* 5/2008 Seubert ............... G06Q 10/06 705/35

* cited by examiner

*Primary Examiner* — Chuck O Kendall
(74) *Attorney, Agent, or Firm* — Fountainhead Law Group P.C.

(57) ABSTRACT

A statement in a software code segment for an application that associates the software code segment to a feature is identified. The software code segment includes a first code block and a second code block for the feature. A feature configuration for the feature is read from a manifest that lists a set of features in the application. When a staging option corresponds to a first staging option, the statement is evaluated against the staging option to remove one of the first code block and the second code block in executable code. When the staging option corresponds to a second staging option, the first software code block and the second code block are included in the executable code. The first code block and the second code block are configurable at runtime to be selected or not selected. The first version or the second version of the executable code are output.

20 Claims, 9 Drawing Sheets

```
                                                200
                                               /
<feature>                       202
        <className>featureName</className>
        <Id>1001</Id>  ~204
        <name>feature name</name>              ⎫
        <description>Performs this feature</description>  ⎬ 206
        <stage>Always Disabled</stage> ~208    ⎭
        <EnabledByDefaultBranchException>      ⎫
        <branch>Branch #1</branch>             ⎬ 210
        </EnabledByDefaultBranchException>     ⎭
</feature>
```

FIG. 2A

```
                                                          114
              212
             /
Void featureName()
{       215            214
       /              /
       if (featureName::isEnabled())
       {
       first software code block  } 216
       }   217
          /
       else
       {
       second software code block } 218
       }
}
```

FIG. 2B

SOFTWARE FEATURE COMPILATION WITH RUNTIME CONFIGURATION

BACKGROUND

Software development projects include a large amount of teams and developers that develop an application. The development process includes generating multiple builds of the application that may include different features. For example, some features may or may not be included in different builds. Controlling which features should be included may require manually changing the source code for the application, which is inconvenient and time consuming for developers. Also, typically, some other feature in the application may depend upon the feature being included in the builds. The dependency may be broken when the feature is removed and an error may occur due to the broken dependency.

BRIEF DESCRIPTION OF THE DRAWINGS

FIG. 2A shows a feature configuration of a feature according to some embodiments.

FIG. 2B shows an example of a software code segment of software code according to some embodiments.

DETAILED DESCRIPTION

A system provides configuration and management of features within software code, such as source code, for an application. A declaration of a feature configuration for a feature is received in a manifest that is separate from the software code. The feature configuration may include a staging option, which are options that allow features, when builds are generated, to be configured differently, such as having the feature removed from executable code for the application, included in the executable code for the application, and if included in the executable code for the application, configurable to be enabled or disabled at runtime.

A system determines how to generate a build of executable code for the software code based on the staging options that are set for features in the manifest. The build may be a version of the application that includes compiled software code (e.g., executable code that can be executed by a computing device). The system may generate executable code that is different depending on the staging options that are set for features; however, the software code (e.g., source code) that is used to generate the executable code remains the same. For example, if a feature is always disabled, a first software code block implementing the feature is removed from the build while leaving the second software code block in the build that does not implement the feature. However, if the feature is always enabled, then a second software code block is removed from the build while leaving the first software code block in the build. Also, if staging configuration for the feature is enabled by default or disabled by default, both the first software code block and the second software code block are included in the build. Then, during runtime, the system allows a user to enable or disable the feature dynamically.

The use of the manifest improves the build process. The separation of the feature configuration from the software code being compiled into executable code allows the system to configure the build in different ways without having to make changes to the software code. By not having to change the software code to have software code for the feature removed or included, or enabled/disabled, the compiling of multiple builds is performed faster because only one compiling is performed to create multiple builds. Also, the storage of the software code is more efficient. Only one copy of the software code is needed to allow multiple changes in the builds to be generated. Also, the software code may always get compiled and linked even if the feature is removed from the build. This allows the system to catch errors in the software code during compilation. Further, the enablement or disablement during runtime may also allow testing of features that are enabled or disabled without having to generate different builds for the feature.

Overview

Figure 1:
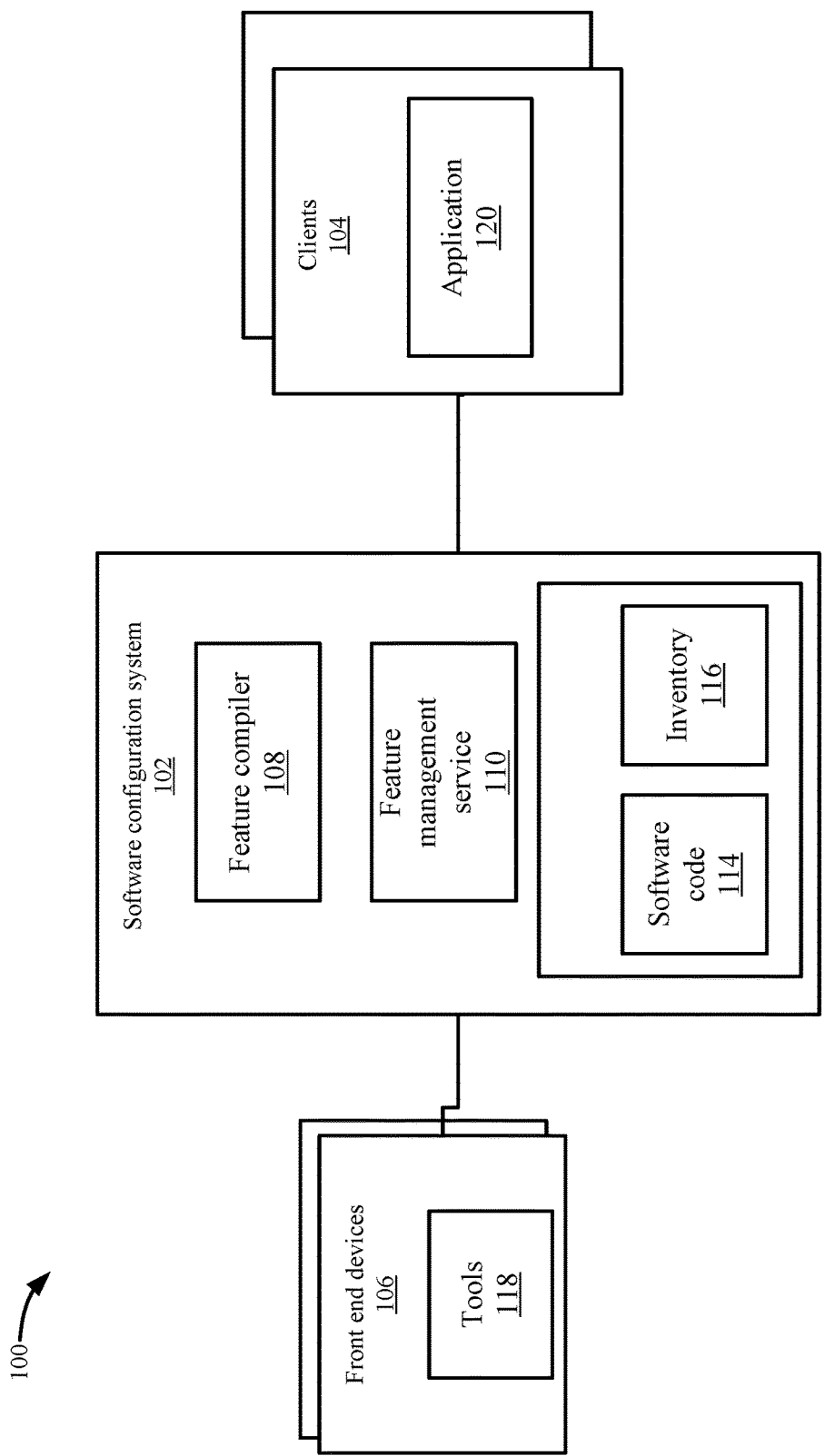
FIG. 1 depicts a simplified system for feature configuration according to some embodiments.

FIG. 1 depicts a simplified system 100 for feature configuration according to some embodiments. System 100 includes a software configuration system 102, clients 104, and front-end devices 106.

Software configuration system 102 includes a feature compiler 108 and a feature management service 110. Also, software configuration system 102 may include storage 112 that may store software code 114 for an application 120 and also an inventory 116 that includes a manifest that is used to configure features for the application. Software code 114 may be written in a computer language by a user and may be referred to as source code that cannot be executed by a computing device without compilation. Software code 114 may then be compiled into executable code, which is in a form that can be executed by a computing device.

Clients 104 may be associated with different users and include computing devices or computing machines that can execute application 120. Although application 120 is shown locally on clients 104, application 120 may be located remotely also. Users may be associated with specific computing devices. Front-end devices 106 may include one or more tools 118 that can be used to configure the features during runtime.

A feature is embodied in software code 114 and when enabled provides some feature in application 120. For example, the feature performs some function when executed, such as a feature may be a menu on an operating system that can be displayed when enabled. When enabled, the menu appears on a user interface during execution, and when disabled, the feature does not appear on the user interface during execution. Other functions may also be performed by features when enabled and disabled. For example, a feature may perform a first function when enabled and a second function when disabled. Using the above example, when a feature is disabled, application 120 may perform another function, such as displaying a different menu from the menu displayed when the feature is enabled.

The manifest in inventory 116 receives feature configurations for features that may be used in software code 114. The features may be declared in the manifest in inventory 116 to allow centralized tracking of the features that are included in software code 114. The manifest is a document that lists multiple features and defines the feature configuration for each of features. In some embodiments, the configuration of the features in the manifest may be in a programming language, such as extensible markup language (XML).

For each feature, a feature configuration may be set that affects the staging configuration of a build of software code 114. A build may be a version of executable code for the application that is generated from software code 114. As will be discussed in more detail below, software configuration system 102 may generate multiple versions of builds without having to change software code 114. To allow this, a statement in software code 114 associates a software code segment with a feature. Then, different staging options may be used to configure the feature differently for different versions of builds for application 120.

In some embodiments, the different staging options include an always enabled staging, an always disabled staging, a disabled by default staging, and an enabled by default staging. The always disabled staging always disables the feature in the build and the always enabled staging always enables the feature in the build. This means the feature cannot be changed at runtime for the build, such as from enabled to disabled, or disabled to enabled. Feature compiler 108 removes a first software code block from software code 114 for the feature when the always disabled staging is used and removes a second software code block from software code 114 for the feature when the always enabled staging is used as will be described in more detail below. The disabled by default stage initially disables the feature in the build, but feature management service 110 may enable the feature (and later disable, and so on) during runtime. The user may use a tool 118 that can change the runtime configuration of the feature or change the runtime configuration locally using client 104. The enabled by default stage initially enables the feature, but feature management service 110 may disable the feature (and later enable, and so on) during runtime. Because the runtime configuration of the feature can be changed, feature compiler 108 includes both the first software code block and the second software code block in the builds for the disabled by default staging and the enabled by default staging. Although enabled or disabled is described, the feature may be selected, such as the first software code block is selected (or feature is enabled) and the second software code block may be selected (or feature is disabled).

Different builds can be created with different staging options. In some embodiments, a default staging option can be specified. Then, exceptions to the default staging option may be specified. The exceptions may be specified on a per branch basis by specifying exceptions of the default staging option, such as one or more of disabled by default, enabled by default, always disabled, and always enabled. Variants may also be used where more than two software code blocks are included for a feature. The variant of the feature may be distinct variants of the feature, rather than enabling or disabling the feature in the build. That is, the first variant of the feature is executed in a first build, a second variant in the second build, a third variant in the third build, and so on. The use of enabled or disabled may not be used in this case; rather, a variant is specified that can be used to select one of the software code blocks. Although the discussion may discuss two software code blocks, it will be understood that more than two software code blocks may be used.

Feature Configuration

FIG. 2A shows a feature configuration 200 of a feature according to some embodiments. In some examples, feature configuration 200 may be in a specified format, such as an XML format. The feature configuration may be separate from software code 114, such as in an XML file, which allows feature compiler 108 to generate different builds without having to change software code 114.

At 202, a class name for the feature is specified in feature configuration 200. The class name is used in software code 114 to associate a software code segment with the feature. Also, each feature may be given a unique ID at 204. The unique ID allows the feature to be identified throughout the development process and also during runtime. As will be discussed in more detail below, the unique ID may be used to provide feedback as to how the feature is used when deployed at runtime. A name and description of the feature may also be provided at 206. The name and description informally describe the feature name and describe the function the feature performs.

At 208, a staging option is specified for the feature. In this example, the staging option is always disabled. However, other staging options that may be used at 208 include always enabled, disabled by default, and enabled by default. Additional staging options may also be specified, such as exceptions and variants that can be used to specify multiple staging options. At 210, the branch may be specified with an exception. That is, another build is generated with the staging option specified. In this example, the second build is generated with an enabled by default staging option instead of the always disabled staging option. Although not shown, variants may also be specified.

A software code segment in software code 114 may be associated with a feature using a specified format that references the feature in the manifest. In some embodiments, the software code segment includes a statement that associates the software code segment with the feature. The same statement is used for all staging options, which allows different stagings to be applied without having to change the software code segment. FIG. 2B shows an example of a software code segment of software code 114 according to some embodiments. A feature class name (featureName) for a feature that is referenced in FIG. 2A is shown at 212 in software code 114. At 214, the software code segment includes a statement to allow different staging options to be applied to the feature without having to change the software code of the feature. Although a statement testing whether the feature is enabled or disabled is described, the statement may determine which staging option corresponds to which software code block. For example, at 214, the statement in software code 114 tests whether the feature is enabled or disabled, such as in some examples, by testing whether the staging is enabled in a conditional statement, such as an if-else statement. The conditional statement test conditions to determine whether the condition is true or false. An if-else statement may be described, but other conditional statements may be used. The if statement at 215 tests whether an argument is true (the feature is enabled in the staging), then a first software code block (e.g., one or more lines of software code) at 216 may be executed to provide the feature. If the feature is not enabled in the staging (e.g., the argument is false), then an else statement at 217 applies and a second software code block (e.g., one or more lines of software code that are executed and do not include the feature in the first software code block) is executed at 218.

Although testing whether a feature is enabled is used by the statement, the statement may also test whether the feature is disabled, or perform other tests to determine whether to execute the first software code block or the second software code block. Further, more than two software code blocks may be included with variant statements, such as if-else if . . . , else statements. In this case, the test may not be just whether the feature is enabled or not, but rather which To provide an example of a feature that is enabled and disabled, an application may display a background picture. The first software code block displays the background picture with a menu (e.g., the menu is the feature) that allows the user to indicate whether the user likes the picture. The second software code block displays the background picture, but does not display the menu. In some embodiments, the first software code block at 216 may be new software code that is being tested and the second software code block at 218 may be previous software code that was previously tested. However, the software code blocks included at 216 and 218 do not need to be new software code and old software code. Rather, the software code at 216 may enable the feature and the software code at 218 may embody another feature.

When the source code segment for the feature is compiled into a build, the build may include different software code for the feature depending on the staging for the feature. For example, if the feature was configured as always enabled, then only the code from the first software code block at 216 is included in the build and not the second software code block. The if-else statement may also be removed since there is only one software code block in the build. However, the if-else statement may also be left in because the staging is set to always enabled and thus the first software code block will always be executed. The reason why the second software code block may be removed when the feature is always enabled is that in the always enabled stage, only the first software code block at 216 is needed during runtime because the feature is always going to be enabled during runtime. The removal of the second software code block may eliminate any accidental disclosure issues.

If the feature is always disabled, then only the second software code block code at 218 is included in the build and not the first software code block. Once again, the if-else statement may also be removed since there is only one software code block in the build. However, the if-else statement may also be left in because the staging is set to always disabled and thus the second software code block will always be executed. Also, in the always disabled stage, only the second software code block at 218 is needed during runtime because the feature is always going to be disabled during runtime.

If the feature is disabled by default or enabled by default, then the first software code block and the second software code block at 216 and 218, respectively, are included in the build. When the feature can be enabled and disabled at runtime, then the code included in the first software code block and the second software code block are both needed since a user can configure the feature to be enabled or disabled at runtime. The if-else statement may be included in the build to determine which of the first software code block and the second software code block to execute during runtime.

Referring back to FIG. 1, feature compiler 108 can receive the manifest including the feature configurations and compile the manifest and software code 114. In some examples, the XML file is compiled into a header file. The compiled header file defines classes and functions that can be used in software code to reference the features declared in the feature configuration. Feature compiler 108 may also compile and link software code 114, or a separate compiler may be used. Further, after compilation, feature compiler 108 may perform build compilation or a separate build compiler may be used. During compilation, feature compiler 108 may compile all the source code for the features and link the source code for the builds. The compilation may generate multiple object files. Linking may then combine the object files. Linking may link references in functions together and find undefined references in functions. Compilation and linking creates executable code, which can be executed by clients 104.

When the software code is compiled and linked, the header file generated by the feature compiler 108 allows feature compiler 108 to recognize and then remove executable code if necessary for the build depending on the staging for the feature. For example, feature compiler 108 can recognize that the if-else statement will always have the same outcome (e.g., always true or always false). Feature compiler 108 can automatically ignore software code (e.g., software code blocks) that has no material possibility of ever being executed at runtime. The software code is removed from the executable code and not the source code.

Feature Compiler

Figure 3:
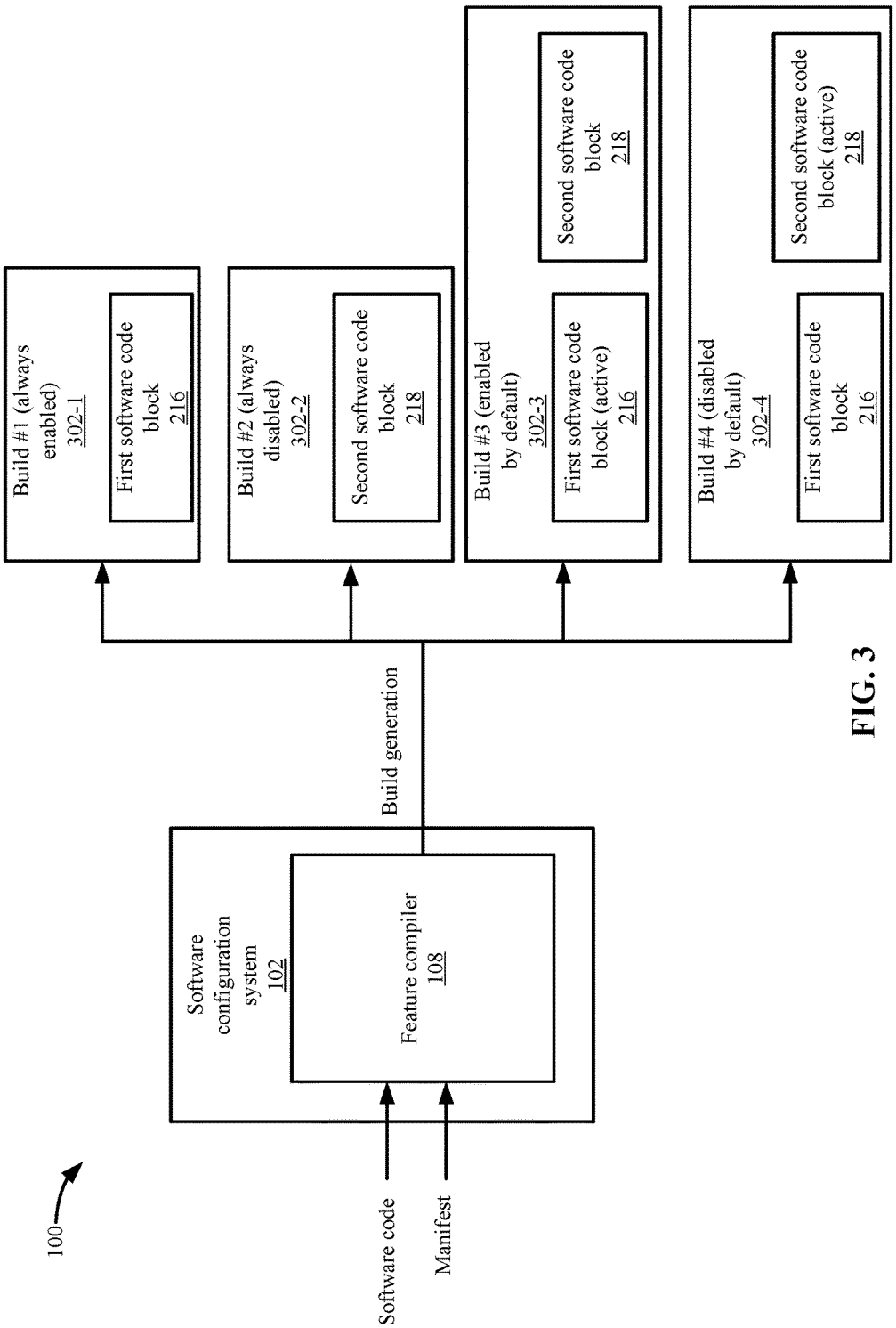
FIG. 3 depicts an example of a feature compiler according to some embodiments.

FIG. 3 depicts an example of feature compiler 108 according to some embodiments. Feature compiler 108 may initially receive the manifest and compiled the features defined in the manifest. Then, software code is received that is written using the feature configurations from the manifest. When the software code is to be compiled and linked, feature compiler 108 receives software code 114 and the manifest from inventory 116.

Feature compiler 108 may then generate the version of the build, such as build #X. The build includes the compiled software code in which either first software code block or the second software code block for the features may be removed. Or, both the first software code block and the second software code block are included in the build, and can be enabled or disabled at runtime. The different types of builds are shown at 302-1-302-4.

At 302-1, a build #1 in which an always enabled feature staging is used includes the first software code block at 216, but not the second software code block. At 302-2, a build #2 in which an always disabled feature staging is used includes the second software code block at 218, but not the first software code block At 302-3 and 302-4, the compiled source code includes both the first software code block and the second software code block. However, different code blocks may be enabled, such as by setting a state for the feature. In some examples, the state may be set in a registry as will be described below. In some embodiments, a default state of enabled is used and no information needs to be set in the registry. However, if the feature should be disabled, then a state of disabled is set in the registry.

At 302-3, if the staging was enabled by default, then a build #3 includes a first software code block at 216 that is active in the beginning of execution. The first software code block may be active because the if-then statement evaluates to true when compared to an enabled state for the feature. In some embodiments, feature compiler 108 may not set any state for the feature because the feature is enabled at first.

At 302-4, if the staging is disabled by default, then a build #4 includes the second software code block at 218 that is active in the beginning of execution (e.g., the feature is disabled). The second software code block may be active because the if-then statement evaluates to false when compared to a state of disabled. Feature compiler 108 may set the state for the feature to disabled to cause the second software code block to be executed.

Some and all of the builds may be generated using the same software code 114. Feature compiler 108 provides many technical advantages in generating the different builds using the feature configuration. By allowing some software code to be removed after compiling and linking using the feature configuration, a developer does not need to change the source code to have the code removed. Further, the format of the source code and the use of the staging options allows feature compiler 108 to generate multiple builds faster because less software code is compiled. For example, to create four different builds conventionally, the feature compiler would have to compile four different versions of the source code. However, using the separate manifest, feature compiler 108 compiles only one version of the source code and then can generate different builds depending on the staging options set in the manifest. Additionally, removing the code at build time guarantees that there will be no accidental disclosure of the code to any unauthorized parties. Also, the code removal at build time means that the code still gets compiled and linked, which allows errors to be caught by compilation and also linking dependencies for functions. Also, a developer can leave a feature in the always disabled state until the feature is completed or removed entirely from the source code. This may eliminate dependencies from other features that may cause errors when dependent upon a feature that is changed from enabled to disabled as another developer may not create a dependency to a disabled feature. Further, removing the code may also remove binaries or application programming interfaces (APIs). The ability to enable and disable the feature at runtime also provides flexibility for testing the feature and conducting experiments. Instead of having to generate a new build, a single build can have the feature enabled or disabled at runtime instead of having to install two separate builds on a computing device.

Delivery Service

Figure 4:
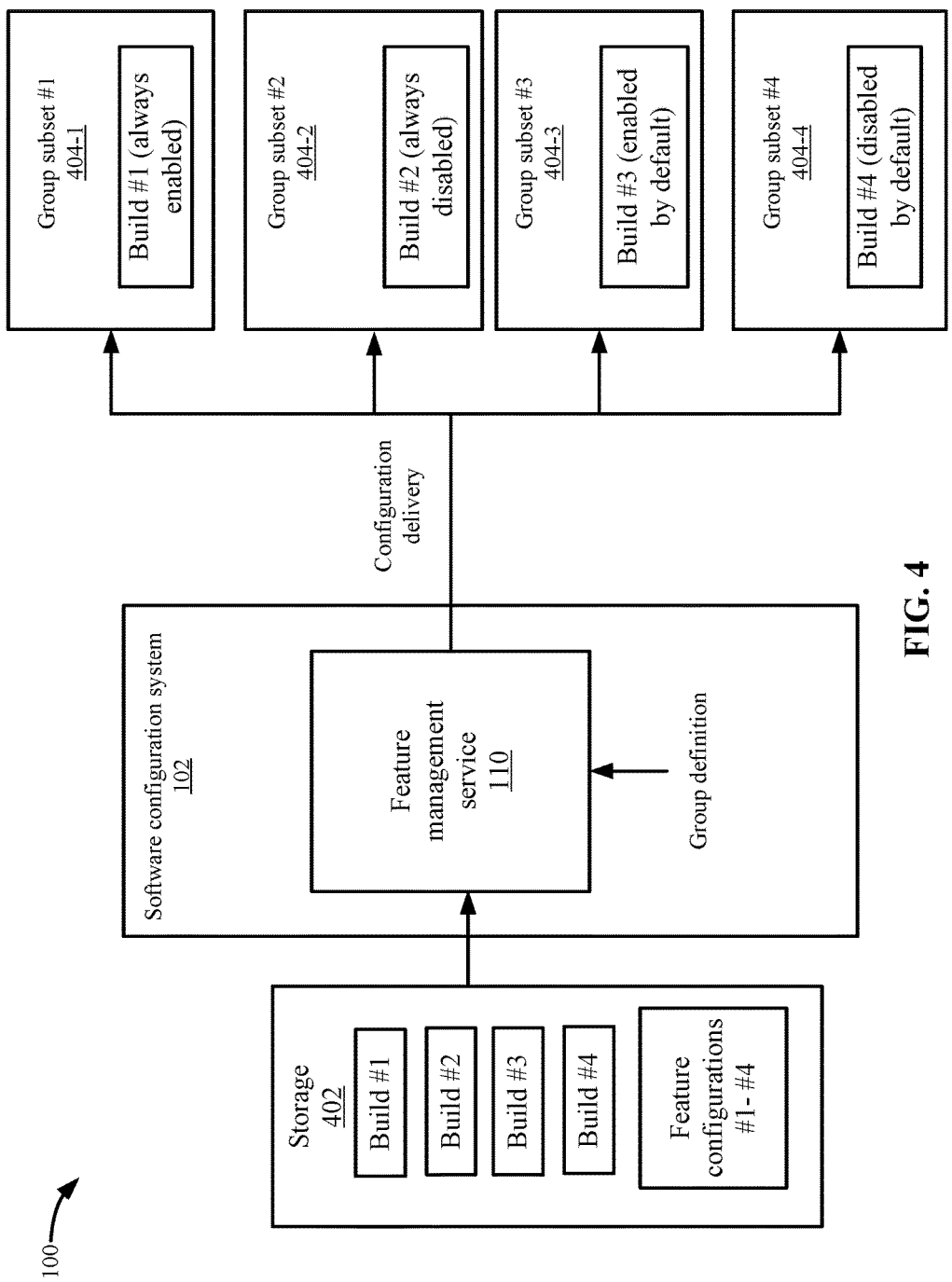
FIG. 4 depicts an example of delivering the builds according to some embodiments.

Once the builds are generated, feature management service 110 can deliver the builds to different groups. FIG. 4 depicts an example of delivering the builds according to some embodiments. Storage 402 may include multiple builds, such as build #1, build #2, build #3, and build #4. Build #1 may have the feature always enabled; build #2 may have the feature always disabled; build #3 may have the feature enabled by default; and build #4 may have the feature disabled by default. Feature management service 110 also receives a compiled feature configuration #1-#4, respectively, for the four builds. As described above, the feature configurations also specify which staging option is applicable for a build.

Additionally, feature management service 110 may receive a group definition that defines which users and/or distribution groups may access the build. For example, the group definition may define users and computing devices (e.g., clients 104) associated with those users that will receive access to the build. In some examples, a user alias that is using a computing device #X may be defined as having access to the build. Also, the group definition may include multiple users that may access the build. The groups may be defined by a group alias, which could correspond to multiple users and computing devices, or by multiple aliases for each user and computing device in the group. The groups may also be defined at times other than runtime, such as during the building process.

Feature management service 110 can then deliver the builds and feature configuration with group definitions to different groups. As a result, within groups, users may have acquired any of builds #1-#4. Each group receives a feature configuration that is the same for all members of the group, but will result in a potentially different outcome depending on what build the member has enabled.

When the users in the respective groups use the application, the features may be configured differently on clients 104 as shown in group subsets 404-1 to 404-4 (group subsets #1-#4). For example, in a group for some users in group subset #1, the feature may be always enabled and always provided during runtime. For group subset #2, the feature is disabled and may not be provided during runtime. And for group subsets #3 and #4, the feature may be enabled by default for group subset #3 and disabled by default for group subset #4. However, it is possible that the feature configuration may be enabled or disabled for group subsets #3 and #4 during runtime. A state of the feature may be set based on the staging in the manifest, such as a state of enabled for the always enabled staging or disabled for the always disabled staging. If the if-else statement is left in the build, during execution, application 120 evaluates the statement for the feature and executes whichever of the first software code block or second software code block that was included in the build.

Runtime Change of Feature Configuration

Figure 5:
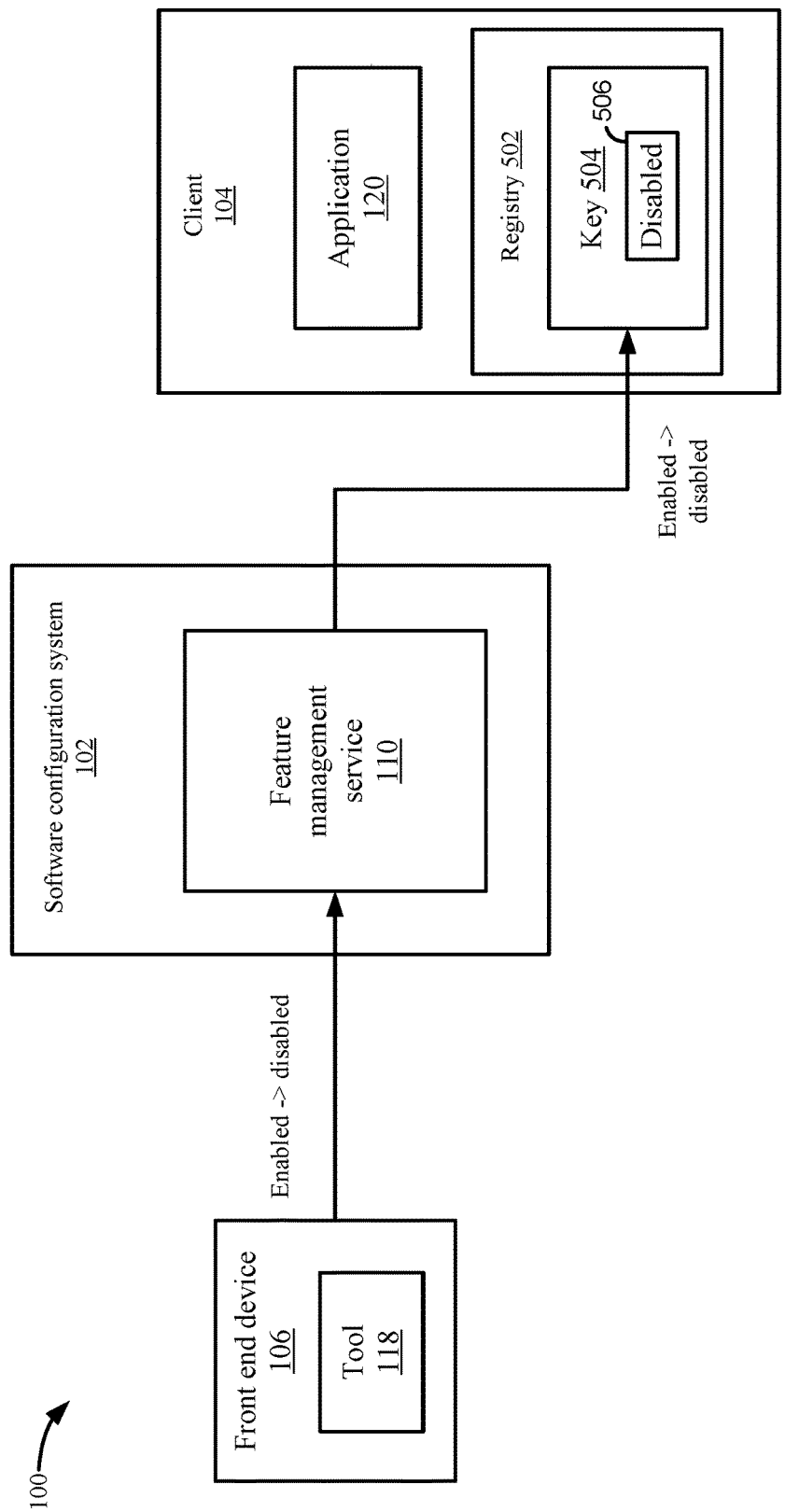
FIG. 5 depicts a more detailed example for changing the staging of the feature according to some embodiments.

FIG. 5 depicts a more detailed example for changing the staging of the feature according to some embodiments. For the enabled by default staging and disabled by default staging, the staging may be changed during runtime from enabled to disabled, and from disabled to enabled. That is, after compilation and creation of a build in which the feature is enabled or disabled, the feature configuration may be later changed from enabled to disabled, or from disabled to enabled at any time during runtime.

In some embodiments, tool 118 in front end device 106 may be used to change the staging of a feature. For example, a user may use tool 118 to input whether or not to enable or disable a feature for a single user or a distribution group of users. Also, the feature owner can choose to enable or disable certain subsets of groups to perform tests, such as A/B tests in which some users have the feature enabled and some users have the feature disabled. In some examples, tool 118 may generate an interface that includes the features included in the manifest. Then, a change in the staging from enabled to disabled, or disabled to enabled, and so on, may be received through tool 118. Tool 118 can be used to change the staging remotely from client 104. In other embodiments, a user of client 104 may enable or disable the feature locally using client 104. This would only change the staging for that user or client 104.

To change the staging of a feature in a build at runtime, feature management service 110 may change a state of the feature. In some examples, feature management service 110 may change the state of a feature in a registry 502. The registry may be a hierarchical database that contains data that is used by the build during execution. Registry 502 may include keys for the features, such a key 504 may be associated with the feature. The keys may be used during execution of the application to enable features. In some embodiments, a single registry 502 applies to a single user of a build. Thus, each user may have an associated registry 502. In other embodiments, a group of users of a build may use a single registry. Although registry keys are discussed as storing the state, the state may be stored in other storage areas and not the registry.

To enable or disable the feature during runtime, feature management service 110 changes a state in key 504 to indicate that the feature is enabled or disabled. In some examples, registry keys may be configured such that if there is no information for the state of a feature in a key, then the state of the feature defaults to a value, such as enabled. In other embodiments, the staging option specified for the feature may determine which is the default state, such as an enabled by default staging defaults to enabled (e.g., when no state is stored) and a disabled by default staging defaults to disabled when no state is stored. In other embodiments, a state of disabled or enabled may always be set, such as a first value is set for the enabled state and a second value is set for the disabled state.

When the feature configuration is changed from enabled to disabled, feature management service 110 writes information into registry key 504 to indicate that the feature has been disabled. In some embodiments, registry key 504 may be stored at client 104, but may be stored elsewhere. At 506, feature management service 110 has written a disabled state to indicate that the feature has been disabled. The information that is written may include setting a bit, setting a flag, or inserting text or other information to indicate the state of disabled. When a user then executes the build, registry key 504 is read during execution, such as when the statement for the feature is encountered. When the state is set as disabled at 506, the application disables the feature and executes the second software code block at 218. When the state is changed back to enabled, the state may be removed such that no information exists for the state or information that indicates the state is enabled may be inserted into registry key 504. Then, when the statement for the feature is encountered, the first software code block at 216 is executed due to the state being enabled.

Figure 6A:
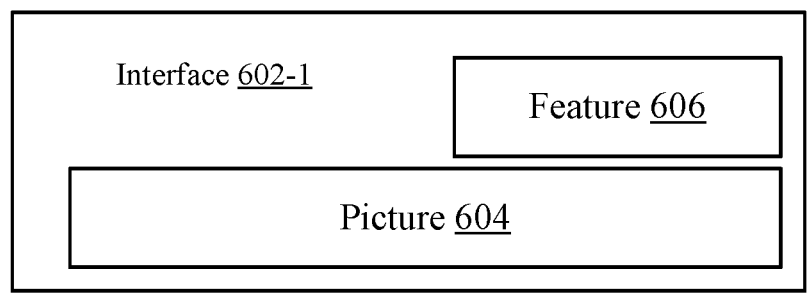
FIGS. 6A and 6B show different states of a feature on a user interface according to some embodiments.
Figure 6B:
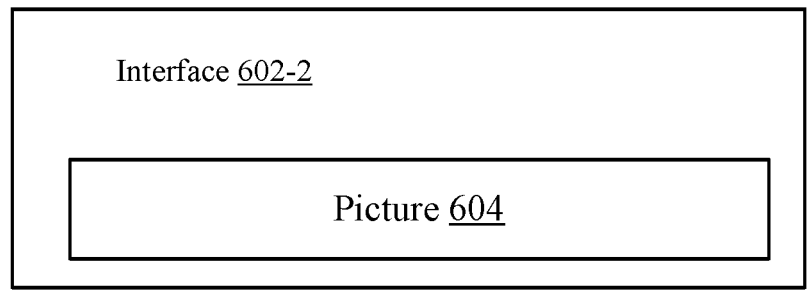

FIGS. 6A and 6B show different states of a feature on a user interface 602 according to some embodiments. In FIG. 6A, an interface 602-1 displays a picture at 604. At 606, a feature is shown that allows a user to input whether or not the user likes or dislikes the picture shown at 604. This state is when the feature is enabled and displayed. In this example, the first software code block is executed, which may display the picture at 604 and feature at 606.

In FIG. 6B, interface 602-2 displays the picture at 604, but no feature at 606. This state is when the feature is disabled and is not displayed. The user cannot input whether or not the user likes or dislikes the picture with the feature disabled. In this example, the second software code block is executed, which may just display the picture at 604.

Reporting

When the feature in the enabled state, because a unique identifier is associated with the feature, feature management service 110 can provide reporting on the use of the feature. For example, clients 104 may execute the build or different builds of the application. When a feature is executed, then, the usage is sent back to feature management service 110 with the unique ID of the feature. Since all features are listed in the manifest with unique IDs, feature management service 110 can then use the unique ID for the feature that has been used to look up which feature was used. Then, feature management service 110 can compile statistics on the use. For example, the statistics may indicate the overall reach of the feature of how many users use the feature when the use of the feature that has been enabled. Further, the feedback for the feature can also be reported as to whether the user liked or disliked the picture as in the picture above.

Additionally, feature management service 110 can receive reports on whether the feature was used in the enabled or disabled state using the unique ID of the feature. Other reporting services may include providing a view of all the builds that are active and which groups are using the builds and where the features have been enabled or disabled at runtime within the groups. Further, clients 104 may send error reports to feature management service 110, which can compile which features have experienced errors.

Figure 7:
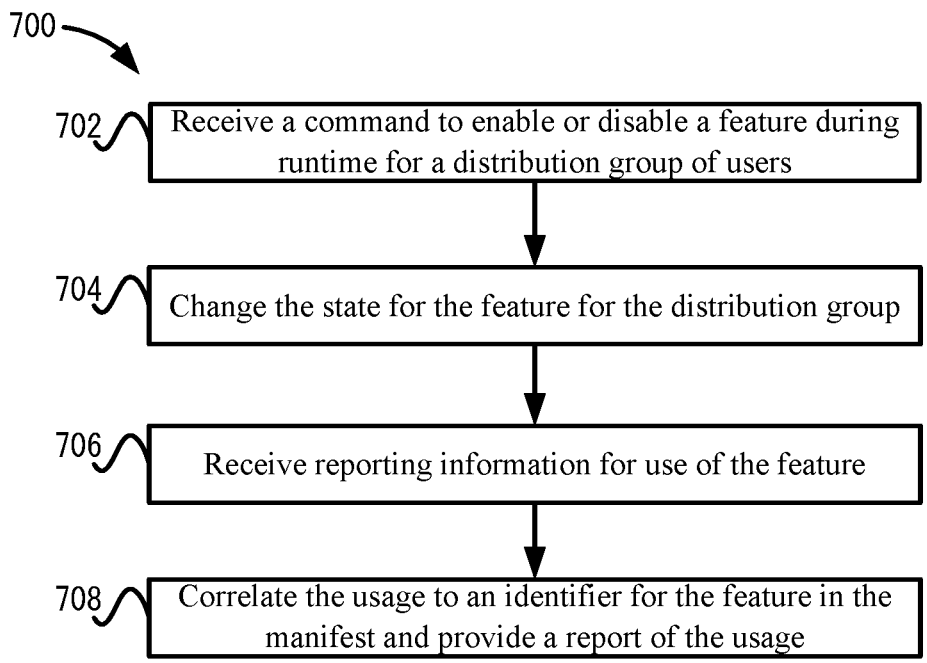
FIG. 7 depicts a simplified flowchart for performing runtime configuration of staging options and reporting according to some embodiments.

FIG. 7 depicts a simplified flowchart 700 for performing runtime configuration of staging options and reporting according to some embodiments. At 702, feature management service 110 receives a command to enable or disable a feature during runtime for a distribution group of users. Runtime may be after software code 114 has been compiled into a build and deployed to clients 104. At 704, feature management service 110 changes the state for the feature for the distribution group. For example, a registry key 504 for the distribution group may be changed to include a state of enabled or disabled. At this point, when the feature is executed by clients 104 in the distribution group, the feature state is changed.

At 706, feature management service 110 receives reporting information for use of the feature. For example, users may use the feature during runtime and statistics on the use are sent back to feature management service 110. Also, the use of the feature may be when the feature was enabled or disabled. At 708, feature management service 110 may then correlate the usage to an identifier for the feature in the manifest and provide a report of the usage.

Experimentation

A developer may set exceptions and variants in the feature configuration. This may automate the generation of exceptions and variants and make the testing run faster. The exceptions and variants may be generated using staging options in the manifest without having to alter software code 114. This generates the different builds faster because software code 114 can be compiled once and then feature compiler 108 can generate the different staging options of the feature using the same compiled software code 114. Further, runtime experimentation is allowed because a feature may be changed during runtime, such as turned on or off, or changed to a different variant.

Overall Method Flow

Figure 8:
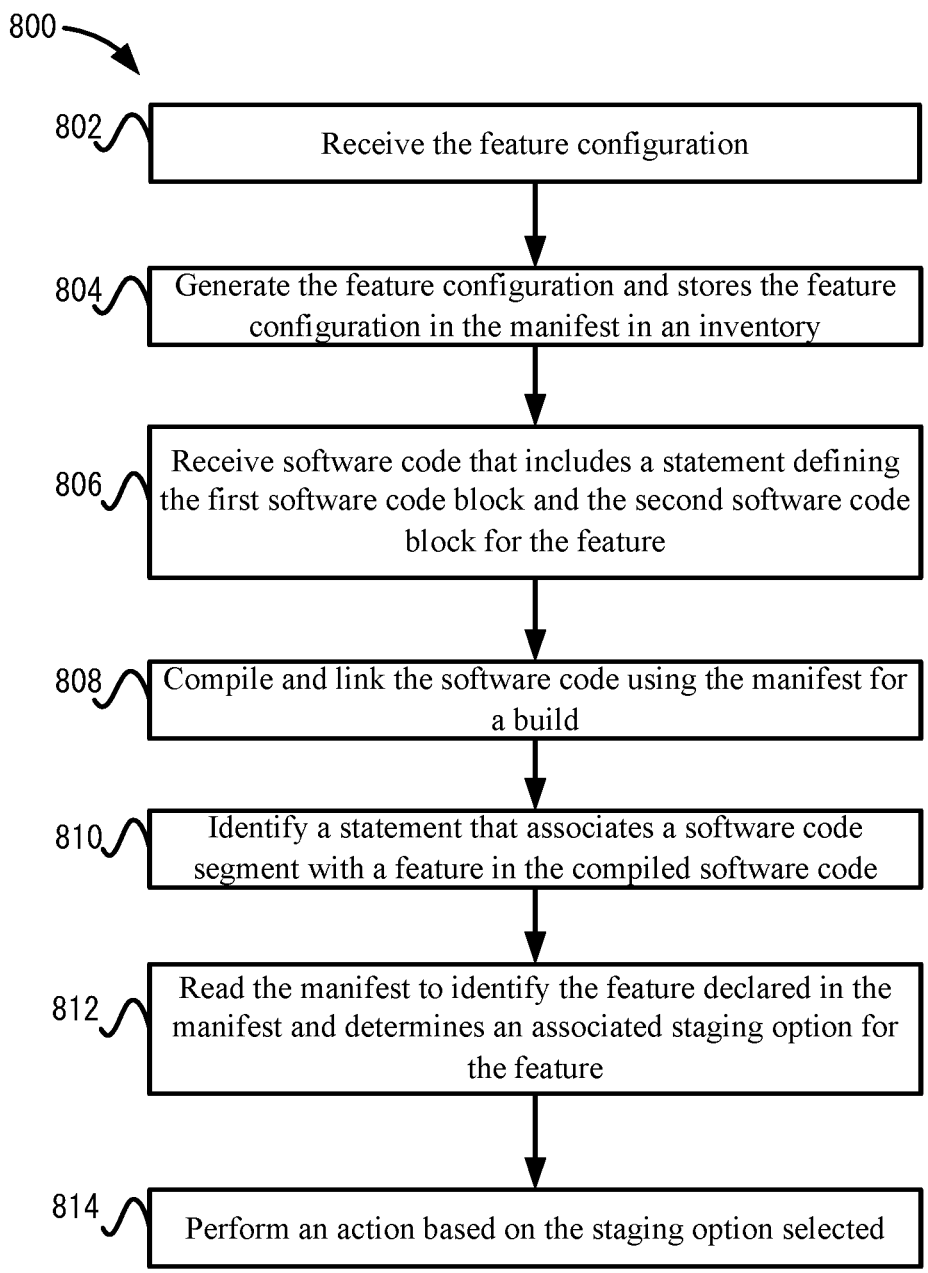
FIG. 8 depicts a simplified flowchart for generating a build of software code according to some embodiments.

FIG. 8 depicts a simplified flowchart 800 for generating a build of software code 114 according to some embodiments. At 802, system 102 receives the feature configuration. For example, a user may use tool 118 to add or edit a feature. Tool 118 may allow a user to input the information included in the feature configuration shown in FIG. 2A. This includes the feature name, feature description, feature ID, and the stage. Other information may also be input.

At 804, system 102 generates the feature configuration and stores the feature configuration in the manifest in inventory 116. After generating the feature configuration in the manifest, the feature may be used in software code 114. At 806, system 102 receives software code 114 that includes a statement defining the first software code block and the second software code block for the feature. For example, system 102 receives the software code in the structure shown in FIG. 2B where the structure of the feature includes the first software code block to execute when the feature is enabled and the second software code block to execute when the feature is disabled.

At 808, feature compiler 108 compiles and links software code 114 using the manifest for a build. At 810, feature compiler 108 identifies a statement that associates a software code segment with a feature in the compiled software code. At 812, feature compiler 108 reads the manifest to identify the feature declared in the manifest and determines an associated staging option for the feature.

At 814, feature compiler 108 performs an action based on the staging option selected. As discussed above, feature compiler 108 may remove one of the first software code block and the second software code block based on the staging option. Also, feature compiler 108 may include both the first software code block and the second software code block and enable one of the first software code block and the second software code block for runtime.

CONCLUSION

Accordingly, system 102 provides staging configuration of features for builds. Different staging configurations are provided without requiring that the source code be changed to change the staging. Additionally, runtime configuration of the features is provided to allow the feature to be enabled or disabled. The feature may be enabled or disabled by setting a state of the feature and the software code is configured to use the state to enable or disable the feature at runtime. Also, exceptions and variants of the staging of a feature may be generated in different builds automatically. The use of staging options allow the feature to be distributed more efficiently and builds to be created without having to change the source code. Also, by using an identifier of the feature, reporting of the usage of the feature is possible. The control of the source code compilation for compiling and the staging configuration is provided by using a feature configuration and a structure of the source code to include statements that use the feature configuration.

Example Computer System

Figure 9:
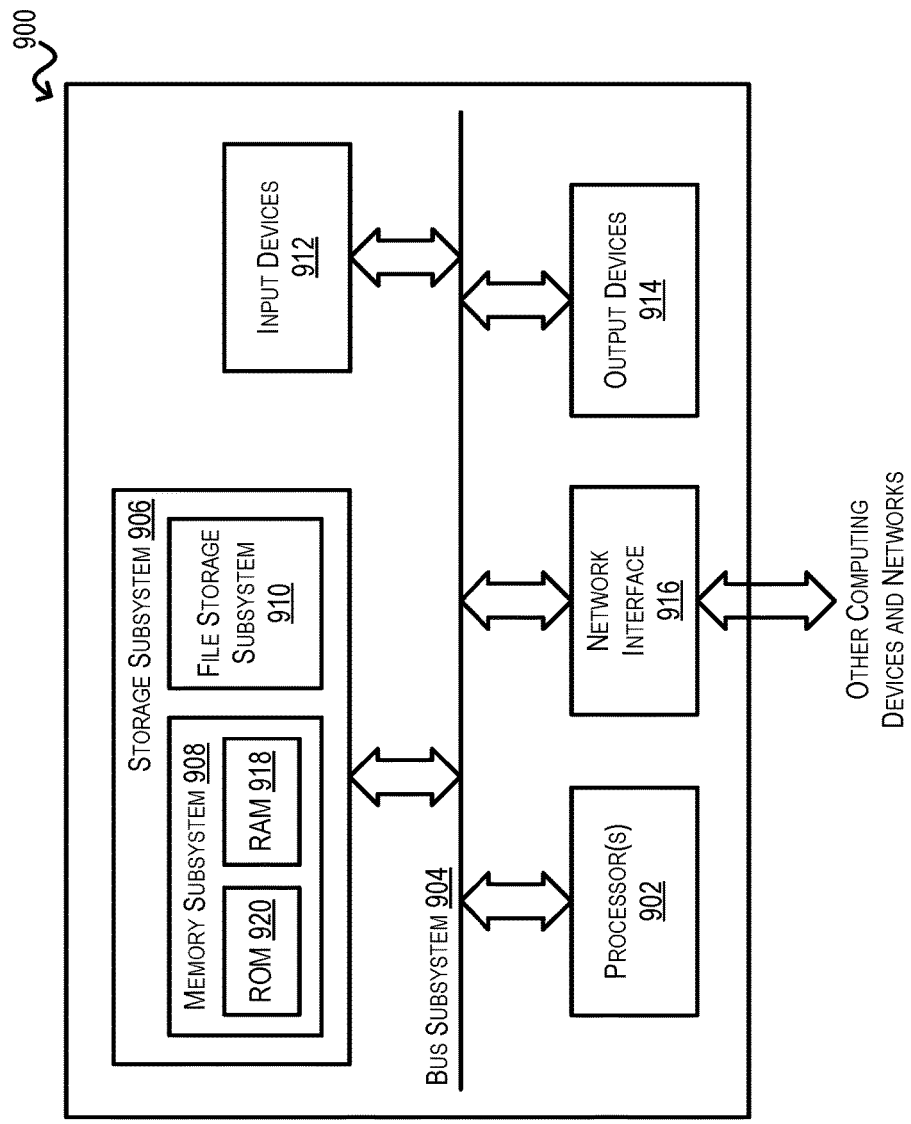
FIG. 9 depicts a simplified block diagram of an example computer system according to certain embodiments.

FIG. 9 depicts a simplified block diagram of an example computer system 900 according to certain embodiments. Computer system 900 can be used to implement any of the computing devices, systems, or servers described in the foregoing disclosure. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
identify a statement in a software code segment for an application that associates the software code segment to a feature, wherein the software code segment includes a first software code block and a second software code block for the feature;
read a feature configuration for the feature from a manifest that lists a set of features in the application, wherein the feature configuration for the feature comprises a staging option selected from a plurality of staging options;

when the staging option corresponds to a first staging option in the plurality of staging options:
  evaluate the statement against the staging option to remove one of the first software code block and the second software code block in executable code that is generated from the software code segment for a first version of the executable code; and
  output the first version of the executable code for the feature;
when the staging option corresponds to a second staging option in the plurality of staging options:
  include the first software code block and the second software code block in the executable code that is generated from the software code for a second version of the executable code, wherein the first software code block and the second software code block are configurable at runtime to be selected or not selected when the staging option corresponds to the second staging option; and
  output the second version of the executable code for the feature.

2. The computer system of claim 1, wherein the software code segment does not need to be changed to generate the first version of the executable code and the second version of the executable code.

3. The computer system of claim 1, wherein:
the first software code block is removed when the first staging option in the plurality of staging options is selected in the manifest, and
the second software code block is removed when a third staging option is selected in the manifest.

4. The computer system of claim 3, wherein:
the first staging option always does not select the feature in the application, and
the third staging option always selects the feature in the application.

5. The computer system of claim 4, wherein:
the statement comprises a conditional statement that executes the first software code block when the feature is selected and executes the second software code block when the feature is not selected.

6. The computer system of claim 5, wherein:
the statement is removed from the executable code when the staging option corresponds to the first staging option or the second staging option.

7. The computer system of claim 1, wherein:
the first staging option selects the first software code block by default, and
a third staging option selects the second software code block by default.

8. The computer system of claim 1, wherein the program code further causes the processor to:
when the first software code block is currently selected, selecting the second software code block and not selecting the first software code block when a command to change a state of the feature is received, and
when the second software code block is currently selected, selecting the first software code block and not selecting the second software code block when the command to change the state of the feature is received.

9. The computer system of claim 8, wherein the program code further causes the processor to:
writing information for the change in the state of the feature, wherein the change in the state is used to select one of the first software code block and the second software code block during runtime.

10. The computer system of claim 9, wherein the state is stored in a registry for the executable code.

11. The computer system of claim 1, wherein when the staging option corresponds to the second staging option, the statement in the executable code is evaluated during runtime to select one of the first software code block and the second software code block based on a state of the feature.

12. The computer system of claim 1, wherein when the staging option corresponds to the first staging option, compiling and linking the first software code block and the second software code block before removing the one of the first code block and the second code block from the executable code for the first version of the executable code.

13. The computer system of claim 1, wherein the program code further causes the processor to:
receive a distribution configuration specifying a set of users; and
configure access to the first version of the executable code or the second version of the executable code to the set of users.

14. The computer system of claim 1, further comprising:
receive usage information including an identifier; and
record the usage information using the identifier.

15. The computer system of claim 1, wherein:
the feature configuration includes a variant definition that specifies two or more of the plurality of staging options, and
multiple versions of the executable code are generated using the software code segment for the application based on the two or more of the plurality of staging options.

16. A method comprising:
identifying, by a computing device, a statement in a software code segment for an application that associates the software code segment to a feature, wherein the software code segment includes a first software code block and a second software code block for the feature;
reading, by the computing device, a feature configuration for the feature from a manifest that lists a set of features in the application, wherein the feature configuration for the feature comprises a staging option selected from a plurality of staging options;
when the staging option corresponds to a first staging option in the plurality of staging options:
  evaluating, by the computing device, the statement against the staging option to remove one of the first software code block and the second software code block in executable code that is generated from the software code segment for a first version of the executable code; and
  outputting, by the computing device, the first version of the executable code for the feature;
when the staging option corresponds to a second staging option in the plurality of staging options:
  including, by the computing device, the first software code block and the second software code block in the executable code that is generated from the software code for a second version of the executable code, wherein the first software code block and the second software code block are configurable at runtime to be selected or not selected when the staging option corresponds to the second staging option; and
  outputting, by the computing device, the second version of the executable code for the feature.

17. The method of claim 16, wherein the software code segment does not need to be changed to generate the first version of the executable code and the second version of the executable code.

18. The method of claim 16, wherein:
the first software code block is removed when the first staging option in the plurality of staging options is selected in the manifest, and
the second software code block is removed when a third staging option is selected in the manifest.

19. The method of claim 16, wherein the program code further causes the processor to:
when the first software code block is currently selected, selecting the second software code block and not selecting the first software code block when a command to change a state of the feature is received, and
when the second software code block is currently selected, selecting the first software code block and not selecting the second software code block when the command to change the state of the feature is received.

20. A non-transitory computer readable storage medium having stored thereon program code executable by a computer system, the program code causing the computer system to:
identify a statement in a software code segment for an application that associates the software code segment to a feature, wherein the software code segment includes a first software code block and a second software code block for the feature;
read a feature configuration for the feature from a manifest that lists a set of features in the application, wherein the feature configuration for the feature comprises a staging option selected from a plurality of staging options;
when the staging option corresponds to a first staging option in the plurality of staging options:
evaluate the statement against the staging option to remove one of the first software code block and the second software code block in executable code that is generated from the software code segment for a first version of the executable code; and
output the first version of the executable code for the feature;
when the staging option corresponds to a second staging option in the plurality of staging options:
include the first software code block and the second software code block in the executable code that is generated from the software code for a second version of the executable code, wherein the first software code block and the second software code block are configurable at runtime to be selected or not selected when the staging option corresponds to the second staging option; and
output the second version of the executable code for the feature.

* * * * *